United States Patent [19]

Omae et al.

[11] 4,249,236

[45] Feb. 3, 1981

[54] CONTROLLER FOR POWER CONVERTER

[75] Inventors: Tsutomu Omae; Tosihiko Matuta, both of Hitachi, Japan

[73] Assignee: Hitachi, Ltd., Japan

[21] Appl. No.: 72,317

[22] Filed: Sep. 4, 1979

[30] Foreign Application Priority Data

Sep. 4, 1978 [JP] Japan .................................. 53-107610

[51] Int. Cl.³ ............................................. H02P 13/26
[52] U.S. Cl. .................................... 363/87; 318/345 C
[58] Field of Search ...................... 363/74, 79, 81, 85, 363/87, 129; 318/345 C, 345 G, 506

[56] References Cited

U.S. PATENT DOCUMENTS 3,902,109 8/1975 Speth et al. ............................. 363/87

Primary Examiner—William H. Beha, Jr.
Attorney, Agent, or Firm—Craig & Antonelli

[57] ABSTRACT

The firing phase of the power converter which can change power to be supplied to a load is determined by the firing angle instruction produced from the current control circuit in accordance with the magnitude of the current difference between the current target value and the current actual value flowing through the load. The nonlinear compensating circuit produces a correction angle instruction predetermined in accordance with the magnitude of the current actual value in the current intermittent region in which the load current becomes intermittent. In the current intermittent region, the sum of the firing angle instruction from the current control circuit and the correction angle instruction is used to determine the firing phase of the power converter and thereby to compensate for nonlinear response. The nonlinear compensation in the current intermittent region is made only in the transient state when the difference between the current target value and the current actual value exceeds a preset value.

Thus, the stability at the steady state condition in the current intermittent region can be increased.

4 Claims, 6 Drawing Figures

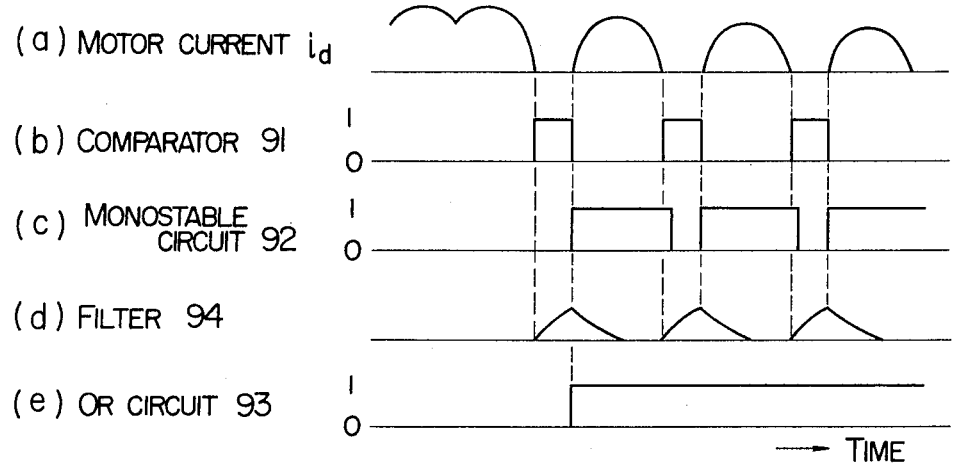
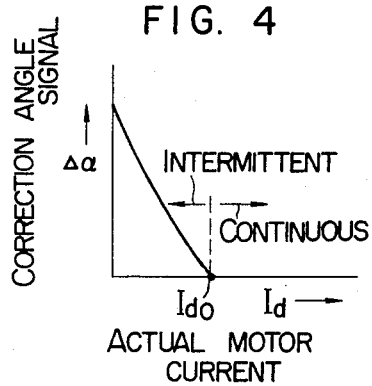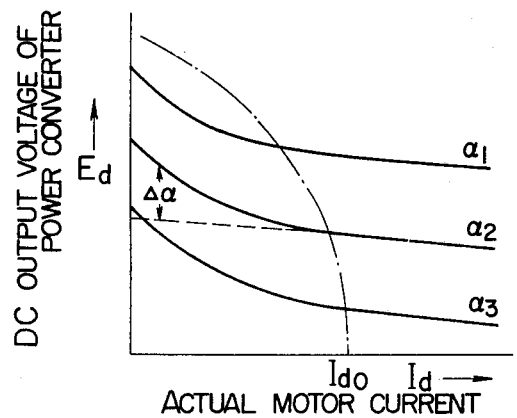
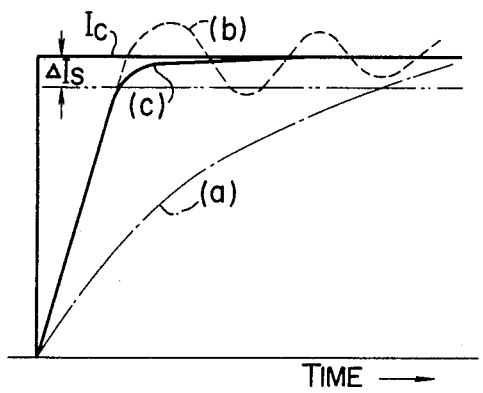

CONTROLLER FOR POWER CONVERTER

BACKGROUND OF THE INVENTION

The present invention relates to the improvement of a controller for power converter which determines and controls the firing phase of the power converter by the current control circuit which is supplied with the current difference between a current target value to be supplied to a load and a current actual value.

Power converters for supplying to a load the power which can be changed by the firing phase control have been widely used in various fields as is well known. For example, a power converter formed by thyristors in Greatz connection is used for driving a DC motor.

When an inductive load such as a motor is driven by a power converter, the current flowing in the power converter takes a continuous or an intermittent conduction state depending on the load condition. As is generally known, the currentless period of time becomes long in the intermittent region, thus greatly changing the gain of the current control circuit which is supplied with the current difference between a target value of current to be applied to a load and an actual value of current frowing therethrough so as to determine the firing phase of the power converter in accordance with the current difference. The current control circuit has its gain greatly reduced in the current intermittent region. Therefore, the response characteristic of the current control circuit must be determined in response to the current intermittent region, and thus the response characteristic thereof in the current continuous region will deteriorate and be unstable.

To solve such a problem, there has hitherto been proposed a nonlinear compensation method by which the nonlinearity of the gain characteristic thereof can be compensated for upon the intermittent current flow as will be described below.

A nonlinear compensating circuit is provided which produces a correction angle for the firing phase (delayed control angle) when an actual value of current to a load is reduced to less than a value at the boundary between the continuous and intermittent current regions (hereinafter, referred to as the current boundary value). This correction angle and a firing angle instruction from the current control circuit are added to be a firing control angle for the power converter, thereby effecting the nonlinear compensation.

However, this nonlinear compensation method has the following defects because the nonlinear compensation is performed in the current intermittent region at all times.

In the nonlinear compensation method, the correction angle is reduced with increase of the actual value of current in the current intermittent region. This means that the increase of the actual value of current reduces the firing control angle, thus increasing the actual value of current. Thus, the nonlinear compensation loop of the nonlinear compensation circuit serves as a positive feedback loop with respect to the current control circuit, thereby impairing the stability of the condition at which the current target value and the current actual value are coincident with each other in the current intermittent region, that is, the stability of the steady-state condition. If the gain of the positive feedback loop of the nonlinear compensation circuit is increased to be larger than that of the negative feedback loop of the current control circuit particularly in order to improve the responsibility of compensation for non-linearity, the effect of the positive feedback loop is dominant thereby causing a hunting in the steady state condition.

On the other hand, if the gain of the negative feedback loop is increased larger than that of the positive feedback loop in order to ensure the stability of the steady state condition in the current intermittent region, the positive feedback loop can not provide an effective nonlinear compensation.

Thus, the nonlinear compensation method is able to improve the response in the current intermittent region, but makes the steady-state condition unstable.

SUMMARY OF THE INVENTION

The object of this invention is to provide a controller for power converter which is able to improve the stability of the steady-state condition in the current intermittent region.

The feature of the invention resides in making the nonlinear compensation only when the difference between the current target value and the current actual value exceeds a predetermined value in the current intermittent region.

Other objects and features of this invention will become apparent from the following description taken in conjunction with the accompanying drawings.

BRIEF DESCRIPTION OF THE DRAWINGS

FIG. 3 shows a timing chart to which reference is made in explaining the operation of the intermittence detector circuit.

FIG. 4 shows a characteristic curve of the nonlinear compensation function.

FIG. 5 shows load characteristic curves of the power converter.

FIG. 6 shows step response characteristic curves with respect to the current target value.

DESCRIPTION OF THE PREFERRED EMBODIMENT

Figure 1:
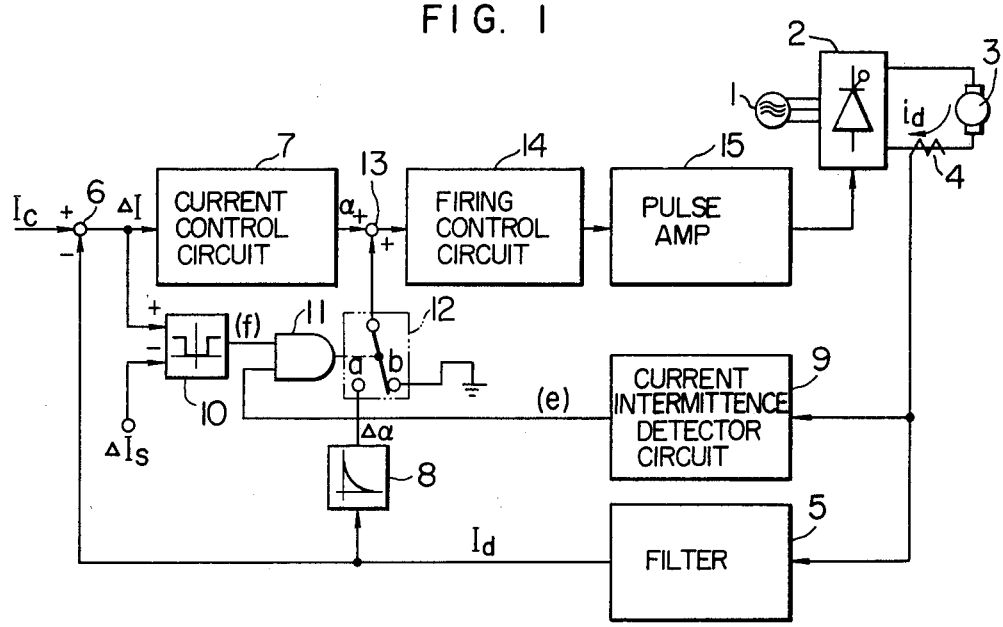
FIG. 1 is a block diagram of one embodiment of the present invention.

FIG. 1 shows one embodiment of the invention, in which reference numeral 1 designates a three-phase AC power supply, 2 a power converter connected to the AC power supply 1 to convert AC to DC and which is formed by, for example, thyristors in Greatz connection. Reference numeral 3 represents a DC motor which is driven by the power converter 2, 4 a DC current transformer for detecting a motor current $i_d$, 5 a filter for smoothing the detected pulsating motor current $i_d$ obtained from the DC current transformer 4, 6 a comparator for comparing a target current value Ic with an actual current value Id produced from the filter 5, and 7 a current control circuit which produces a firing angle instruction $\alpha$ in accordance with a current difference $\Delta I$ and which is usually of the PI (proportional integration) operation type. In addition, reference numeral 8 denotes a non-linear compensation circuit which produces a correction angle instruction $\Delta\alpha$ when the actual current value Id is decreased to less than a boundary current value Ido, that is, when the current Id enters in the current intermittent region as shown in FIG. 4, the correction angle instruction $\Delta\alpha$ being increased with decrease of the actual motor current Id. A function generator, for example, is used for the nonlinear compensation circuit 8. Reference numeral 9 represents a current intermittence detector circuit for detecting the intermittent state of the motor current $i_d$, as will be described in detail later, and 10 a comparator which compares the current difference $\Delta I$ with a preset value $\Delta Is$, and which, when $|\Delta I| > \Delta Is$, produces a "1" level output. Reference numeral 11 designates an AND circuit, 12 a change-over switch which operates to change to a terminal-a position when the AND circuit 11 produces a "1" level output and to change to a terminal-b position when it produces a "0" level output, in which case the terminal-b position is connected to ground. Moreover, numeral 13 represents an adder, 14 a firing control circuit and 15 a pulse amplifier.

Figure 2:
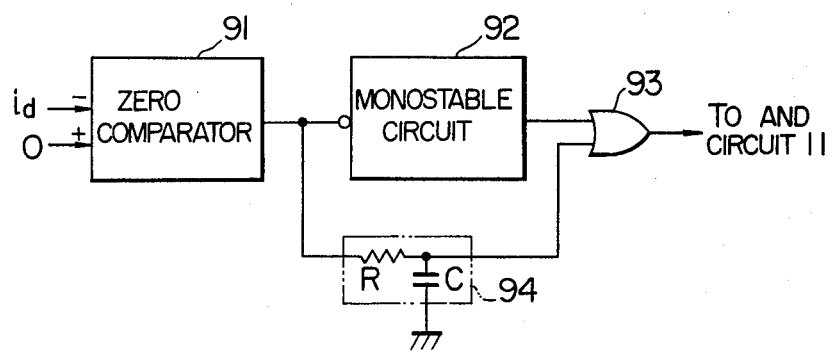
FIG. 2 is a connection diagram of one example of the intermittence detector circuit in FIG. 1.

FIG. 2 shows one example of the current intermittence detector circuit 9. Reference numeral 91 is a zero comparator which produces a "1" level output when the motor current $i_d$ reduces to zero. When the motor current $i_d$ intermittently flows, a rectangular wave output synchronized with the current intermittence is generated from the zero comparator 91. Shown at 92 is a monostable circuit which is triggered when the output of the zero comparator circuit 91 changes from "1" to "0" level, that is, synchronized with the falling edge of the output. Shown at 93 is an OR circuit, and 94 a filter consisting of a resistor R and a capacitor C.

The operation of the intermittence detector circuit 9 will next be described.

Upon continuous current, the zero comparator 91 produces "0" level output at all times. Thus, the intermittence detector circuit 9 produces "0" level output and the AND circuit 11 also produces "0" level output, thereby operating the switch 12 to be connected to the terminal-b position. Under this condition, the motor current $i_d$ is controlled as described below.

The comparator 6 compares the current target value Ic with the current actual value Id produced from the filter 5, thus producing the current difference $\Delta I$, which is supplied to the current control circuit 7. This current control circuit 7 outputs the firing angle instruction $\alpha$ in response to the current difference value $\Delta I$ and supplies it to one input of the adder 13. The other input of the adder 13 is at zero potential because it is grounded through the terminal-b of the change-over switch 12. The firing control circuit 14 thus generates a firing pulse with a phase in accordance with the firing angle instruction $\alpha$ and supplies it as a gate signal through the pulse amplifier 15 to the thyristors of the power converter 2. As a result, the voltage applied to the DC motor 3 is changed so that the motor current $i_d$ is controlled to equal to the current target valve Ic.

When the motor current $i_d$ is intermittently flowed as shown in FIG. 3, the zero comparator 91 produces "1" level output at currentless intervals of current $i_d$ and thus generates a rectangular wave signal synchronized with the current $i_d$. The monostable circuit 92 is synchronized with the falling edge of the rectangular signal to generate a pulse signal of a preset constant duration. This pulse duration determined by the monostable circuit 92 is selected a little longer than a firing period of the power converter 2. If the frequency of the three-phase AC power supply 1 is 50 Hz, and if the power converter is of three-phase full wave rectification configuration, the firing period is 3.3 ms and the preset duration of the pulse from the monostable circuit 92 is 5 ms for example. If the power converter is of three-phase half wave rectification configuration, the duration of pulse from the monostable circuit 92 is selected to be 8 ms. Thus, the monostable circuit 92 generates repetitive pulses of a constant duration until the motor current $i_d$ enters in the continuous region. The pulse output from the monostable circuit 92 is applied to the OR circuit 93. On the other hand, the output of the zero comparator 91 is applied through the filter 94 to the OR circuit 93. The time constant of the filter 94 is set at substantially a firing period of time of the power converter. The output of the filter 94, as shown in FIG. 3, increases to a predetermined voltage at the rising edge of the pulse output of the monostable circuit 92. This filter 94 is provided in order to make the output of the OR circuit 93 continuous upon current intermittence even though the pulse from the monostable circuit 92 is risen gently with a time constant, not sharply as shown in FIG. 3. The OR circuit 93 thus produces "1" level output during intermittent flow of the motor current $i_d$. When the motor current $i_d$ enters in the current continuous region, the OR circuit 93 starts producing "0" level output with a delay corresponding to one-shot cycle time of the monostable circuit 92. This delay is very short and thus causes no trouble from a practical point of view.

As described previously, during intermittent flow of the motor current $i_d$, the intermittence detector circuit 9 produces "1" level output. The output signals from the detector 9 and comparator 10 are supplied to the AND circuit 11, from which the logical product thereof is thus produced. When both the signals are of "1" level, that is, when the current $i_d$ is in the intermittent region and upon the transient period the current difference $|\Delta I|$ is larger than the preset value $|\Delta Is|$, the AND circuit 11 produces "1" level output. When the output of the AND circuit 11 becomes "1", the change-over switch 12 is operated thereby to change to the terminal-a position, thus permitting the correction angle signal $\Delta\alpha$ from the nonlinear compensation circuit 8 to be added in the adder 13 to the firing angle instruction $\alpha$ from the current control circuit 7.

When the actual motor current Id is decreased to less than the current boundary value Ido, the nonlinear compensation circuit 8 produces the correction angle signal $\Delta\alpha$ which increases with decrease of the current Id as shown in FIG. 4. The nonlinear compensation circuit 8 used is, for example, a function generator. The characteristic of the nonlinear compensation circuit 8 is determined as follows. FIG. 5 shows a generally known relation between the DC output voltage (average value) Ed of the power converter 2 and the actual motor current (average DC current) Id together with different values $\alpha_1$, $\alpha_2$, $\alpha_3$ ($\alpha_1 > \alpha_2 > \alpha_3$) of the firing phase $\alpha$ as a parameter. From FIG. 5, it will be seen that the rate of voltage change with respect to very small change of current, dEd/dId in the current continuous region is very different from that in the intermittent region for each value of the firing phase $\alpha$. This results in decrease of the response in the current intermittent region. Thus, the compensation for the nonlineality of the value of dEd/DId is performed such that the firing phase $\alpha$ below the boundary current value Ido is corrected by $\Delta\alpha$ in accordance with the current Id as shown by a broken line extending straight from the straight line in the current continuous region. The characteristics of the nonlinear compensation circuit 8 is thus determined by the correction angle $\Delta\alpha$.

The correction angle $\Delta\alpha$ changes with the magnitude of the firing phase $\alpha$ as shown in FIG. 5, and thus for simplicity the characteristic of the nonlinear compensation circuit 8 will be established for a particular firing phase $\alpha_2$.

The nonlinear compensation circuit 8 is characterized by the correction angle $\Delta\alpha$ and produces the correction angle signal $\Delta\alpha$ in accordance with the current Id. This correction angle signal $\Delta\alpha$ is added to the phase angle instruction $\alpha$ in the adder 13, the output of which is applied to the firing control circuit 14. The firing control circuit 14 supplies a gate signal with the firing phase of $\alpha + \Delta\alpha$ to the thyristors of the power converter 2. Consequently, the current $i_d$ flowing in the DC motor 3 is controlled to equal the target current value Ic.

Under the transient condition that the current difference $|\Delta I|$ is larger than the preset value $|\Delta Is|$ in the current intermittent region, the firing phase of the power converter 2 is controlled by the sum of the firing angle instruction $\alpha$ from the current control circuit 7 and the correction angle signal $\Delta\alpha$ form the nonlinear compensation circuit 8. Thus, the value of dEd/dId in the power converter 2 becomes a straight line as indicated by the dotted line in FIG. 5, providing an improved response characteristic in the current intermittent region.

Meanwhile, under the so-called steady-state condition that the current difference $|\Delta I|$ is smaller than the preset value $|\Delta Is|$, the comparator 10 produces output (f) of "0" level, and thereby causes the AND circuit 11 to produce "0" level output, which then forces the switch 12 to operate to change to the terminal-b position. Accordingly, the firing phase of the power converter 2 under the steady state condition is controlled on the basis of the phase angle instruction $\alpha$ from the current control circuit 7, that is, the nonlinear conpensation is not performed.

As described above, the nonlinear compensation is performed only in the transient state that the current deviation from the preset value is large, but in the steady state in which the deviation is small, the nonlinear compensation is not performed, so that the stability of the steady state can be enhanced.

FIG. 6 shows step-response characteristic curves of the DC current Id in the case of stepwise change of the current target value Ic.

In FIG. 6, a one-dot chain line (a) represents the curve without nonlinear compensation, a dotted line (b) the curve with nonlinear compensation made in both transient state and steady state condition, and a solid line (c) the curve according to the invention. From FIG. 6 it will be seen that the additional nonlinear compensation in the steady state will cause the current actual value Id to fluctuate, loosing the stability, and on the contrary the present invention enables the current actual value Id to reach the target value Ic without causing the fluctuation (hunting), thereby increasing the stability at the steady-state condition.

In accordance with the present invention, the nonlinear compensation is made upon the transient period in the current intermittent region and thus it is effective to increase stability at the steady state condition.

In addition, this embodiment utilizes the actual current for detecting the current intermittent state, thereby surely preventing the troubles that the nonlinear compensation is excessively made in the current continuous region and not made upon transient period in the current intermittent region, although the current target value can be utilized for detecting the current intermittent condition.

While the above description has been made of the case where the nonlinear compensation circuit is set at a certain phase-angle characteristic, the characteristic of the nonlinear compensation circuit may be desirably variable in accordance with the phase angle instruction $\alpha$ at the current boundary value. However, changing the characteristic according to all of the phase angle instruction $\alpha$ will make the nonlinear compensation circuit compricated. Therefore, it will be practical enough to change the characteristic of the nonlinear compensation circuit for several phase-angle values. In this case, although excessive or insufficient compensation may take place, increase of the stability at the steady state can be effected even under excessive compensation, as is obvious from the fact that the nonlinear compensation is not made at steady-state condition.

In accordance with the present invention, as described above, since the nonlinear compensation is performed only at the transient period in the current intermittent region, the stability at normal time can be increased and as a result the power converter can be controlled stably.

While a DC motor is used as a load in the above embodiment, it will be understood that other motors and inductive loads to which a continuous or intermittent current depending on operating condition is flowed from the power converter may be used and the nonlinear compensation can be similarly performed with a different compensation characteristic.

While the controller used in the above embodiment is of analog type, it may of course be of the digital type using a microprocessor or the like.

It will be apparent that many modifications and variations may be effected without departing from the scope of the novel concepts of this invention.

We claim:

1. A controller for power converter having a power converter which is controlled in firing phase and thus supplies variable power to a load, a current control means for producing a firing angle instruction in accordance with the current difference between a current target value and a current actual value flowing through said load, a nonlinear compensation means for producing a predetermined correction angle instruction in accordance with said current actual value during the current intermittent region of the current through said load, an adding means for adding said firing angle instruction to said correction angle instruction, and a firing control means for controlling the firing phase of said power converter in accordance with the added value from said adding means, said controller for power converter further comprising:

a state-discriminating means for discriminating between a steady-state condition and a transient state in accordance with the magnitude of said current difference;

an intermittence detecting means for detecting that said load current has entered in a current intermittent region; and a switching means for permitting said correction angle instruction to be added to said firing angle instruction when the transient state occurence is detected by said state discriminating means and when the intermittent state is also detected by said intermittence detecting means.

2. A controller for power converter according to claim 1 wherein said nonlinear compensating means is able to change the magnitude of said predetermined correction angle instruction by the magnitude of a firing angle instruction at a current boundary value.

3. A controller for power converter according to claim 1 wherein said intermittence detecting means detects from the current actual value that the load current has changed to the intermittent state.

4. A controller for power converter having a power converter which is controlled in firing phase and thus supplies variable power to a load, a current control means for producing a firing angle instruction in accordance with the current difference between a current target value and a current actual value flowing through said load, a nonlinear compensation means for producing a predetermined correction angle instruction in accordance with said current actual value during the current intermittent region of the current through said load, an adding means for adding said firing angle instruction to said correction angle instruction, and a firing control means for controlling the firing phase of said power converter in accordance with the added value from said adding means, said controller for power converter comprising:
- a comparing means for producing an output when the absolute value of said current difference exceeds a preset value;
- an intermittence detecting means for producing an output when said load current becomes intermittent;
- a logical product producing means for producing the logical product of the outputs from said comparing means and said intermittence detecting means; and
- a switching means for permitting said correction angle instruction to be added to said firing angle instruction when said logical product producing means produces an output.

* * * * *